United States Patent [19]

Ramström

[11] 3,825,864

[45] July 23, 1974

[54] AERIAL TUNING DEVICE

[75] Inventor: Sven Ramström, Lyckeby, Sweden

[73] Assignee: Karlskronavarvet AB, Karlskrona, Sweden

[22] Filed: June 25, 1973

[21] Appl. No.: 373,099

Related U.S. Application Data

[63] Continuation of Ser. No. 177,369, Sept. 2, 1971, abandoned.

[52] U.S. Cl. ........................ 334/39, 333/32, 334/69, 336/141, 343/745

[51] Int. Cl. ........................ H03j 5/00, H03h 7/38

[58] Field of Search ........ 334/69, 39; 343/745, 850; 336/139, 141; 325/171, 172, 174–177; 333/32

[56] References Cited

UNITED STATES PATENTS

| | | | |
|---|---|---|---|
| 886,302 | 4/1908 | Massie | 334/69 |
| 2,704,352 | 3/1955 | Schmidt, Jr. | 336/141 X |
| 2,910,661 | 10/1959 | Glynn | 336/139 |
| 3,260,973 | 7/1966 | Bisnett et al. | 334/69 |

FOREIGN PATENTS OR APPLICATIONS

| | | | |
|---|---|---|---|
| 669,816 | 1/1939 | Germany | 334/69 |

*Primary Examiner*—Paul L. Gensler
*Attorney, Agent, or Firm*—Cushman, Darby & Cushman

[57] ABSTRACT

An aerial tuning device comprising a coil and a capacitor having variable inductance and capacitance, respectively, said coil being connected in series with the aerial and also connected to the capacitor. The coil is provided with a movable contact, and the capacitor has a continuously rotating adjustment shaft, said shaft being operatively linked with said movable contact, so that the shaft is rotated at the same time as the contact of the coil is moved. Thus, during the movement of the coil contact, the capacitance of the capacitor varies up and down between a minimum value and a maximum value.

2 Claims, 1 Drawing Figure

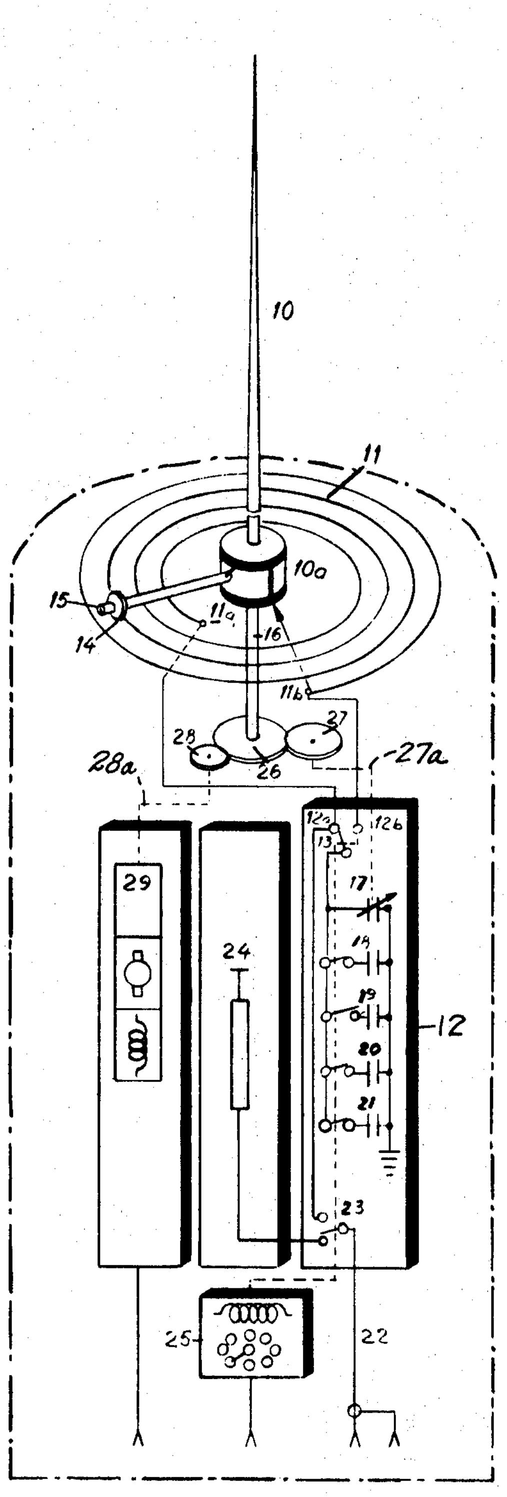
10
11
10a
15
14
11a
16
11b
27
28
26
28a
27a
12a
12b
13
17
29
24
18
19
20
21
12
23
25
22

AERIAL TUNING DEVICE

This is a continuation of application Ser. No. 177,369 filed Sept. 2, 1971, now abandoned.

The present invention relates to an aerial tuning device, comprising a variable inductance coil connected in series with the aerial and a variable capacity capacitor connected to the coil, the coil and the capacitor in combination forming a tuning circuit for the aerial.

In order to obtain the maximum output from a transmitter aerial it is necessary that on one hand the aerial is tuned to the transmission frequency so that the aerial at said frequency presents a purely resistive aerial impedance and that on the other hand the resistive aerial impedance is matched to the resistance of the aerial feeder, i.e. that the aerial resistance is equal to the resistance of the aerial feeder so that standing waves on the aerial feeder are avoided. By selection of the length of the aerial, the aerial can be tuned so that the aerial impedance is purely resistive for a predetermined frequency. However, this has the inconvenience that at relatively low radio frequencies (long waves) the aerial will have a great length and that at other frequencies than the frequency intended the aerial will present an inductive or capacitive aerial impedance. These inconveniences can be avoided if the aerial is connected in series with a coil, which in combination with a capacitor connected to the coil can form a tuning circuit for the aerial. The inductance of the coil can thereby provide the aerial with electrical characteristics which correspond to an aerial with a substantially greater length and the capacitance of the capacitor can provide the aerial with characteristics corresponding to a substantially shorter aerial. By means of a suitable adjustment of inductance and capacitance in the tuning circuit of the aerial the aerial can thus be provided with a resistive aerial impedance within a wide frequency range and at the same time be matched to the aerial feeder. However, up to the present this has required at least two mutually independent adjustment shafts and tuning movements and in the case of adjustment by motors, at least two drive motors. It is easily understood that both in regard of cost as well as in regard of reliability and space requirement this arrangement involves a serious inconvenience.

Due to the fact that previously two tunings have been required, the tuning operation has also been more time consuming. The time factor is of great importance, since in many cases rapid frequency changes of the transmitter are required so as to obtain a good radio communication. For example, it is usual to make a call on one frequency and then continue the radio communication on another frequency.

The main object of the present invention is to provide an aerial tuning device, which allows a rapid tuning and matching of an aerial to various frequencies within a wide frequency range and which is extremely simple to operate and in addition requires exceedingly small space.

This object is attained according to the invention with a tuning device which is characterized in that the coil is provided with a contact, which is movable along the winding turns of the coil, and that the capacitor has a continuously rotating adjustment shaft, which is coupled with the movable contact of the coil and adapted to be rotated at the same time as the contact of the coil is moved and during the continuous rotation of which the capacitance of the capacitor varies up and down between a minimum value and a maximum value.

By means of the invention it is also possible to tune the aerial in a simple manner to earth planes of various qualities. Said earth planes may be very different, depending on where and how the aerial is installed.

One embodiment of the invention will now be described more closely below with reference to the accompanying drawing, which illustrates a perspective view of a tuning device according to the invention.

On the drawing a rod aerial 10 is illustrated, which is connected to an aerial tuning circuit in the form of a helically wound disc coil 11 and a capacitor unit 12, which by means of a switch 13 is connectable to the one or the other end 11*a* and 11*b*, respectively, of the disc coil 11. One end 11*a* of the disc coil is connected to the contact 12*a* in the capacitor unit and the other end 11*b* of the disc coil is connected to the contact 12*b* in the capacitor unit 12. The other end 11*b* of the disc coil is in direct contact with the aerial 10 and with a contact 14, which is movable on the disc coil. This contact is formed as a wheel, which is supported axially movable on a shaft 15, adapted to be rotated around a shaft 16, which is arranged in the centre of the coil and perpendicular to the plane of the coil on rotation of the last mentioned shaft. By means of the shaft 15 the contact wheel 14 is in direct electrical connection with both the aerial 10 and the end 11*b* of the disc coil and, consequently, provides a short circuit of that part of the coil which is located between the contact point and said end 11*b* of the coil. The contact wheel 14 is arranged during rotation of the wheel shaft 15 around the centre shaft 16 to be moved by rolling on that winding turn in the coil at which the wheel is located, whereby the wheel during the rolling on a winding turn due to its form is guided by the winding turns of the disc coil and thereby moved axially on the wheel shaft 15.

In order to facilitate the guiding of the contact wheel 14 on the winding turns of the coil the coil is formed of a copper band, which is placed edgewise in the separate winding turns. The coil winding will thus operate as a track or a rail for the contact wheel, which is provided with radially extending flanges at its periphery, which serve to maintain the wheel on the track.

The inductance of the coil can be varied between 0.5 and 130 H. The coil bobbin is formed by a plate of polyester plastic, wherein the coil is secured. In the centre of the coil there is a hub 10*a*, which on one hand allows the angular turning of the shaft 15, when the shaft 16 is turned or rotated, and on the other hand allows a movable connection between the coil and the aerial by means of a resilient contact pin. In order to obtain a good contact the contact wheel 14 is pressed against the winding of the coil by means of a flat spring, not shown.

The capacitor unit 12 comprises a variable capacitor 17 and a plurality of fixed capacitors 18–21, which are adapted to be separately connected in parallel with the variable capacitor. The variable capacitor 17 comprises a plurality of plates which can be rotated around a carrier shaft and adapted to capacitively cooperate with a plurality of fixed plates and which may be rotated more or less between the fixed plates for variation of the capacitance. The capacitor plates can be rotated continuously around the carrier shaft in such a manner that the capacitance of the capacitor unit can be varied continuously in both directions between a minimum value and a maximum value. The fixed capacitors 18–21 adapted to be connected separately are dimensioned in regard of their capacitance values so that the capacitor unit can produce the capacitance values required for the tuning.

The capacity unit can be connected by means of a switch 13 either to one end 11*a* of the coil via the contact 12*a* or else to the other end 11*b* of the coil via the contact 12*b*. Thereby the tuning circuit can be caused to comprise a coil with either an inductance input or a capacitance input. This is necessary in order to allow the aerial to be tuned to a resistive aerial impedance, independent of whether the aerial from the beginning has an inductive or a capacitve aerial impedance.

The end 11*a* of the disc coil directed away from the aerial is connected via a feeder cable 22 for high frequency to the final stage of a radio transmitter, not shown. The feeder cable 22 can be connected by means of the switch 23 alternatively to an artificial aerial 24. The switching on and off of the various fixed capacitors and the movement of the switches 13 and 23 is performed by means of a rotary magnet switch 25.

The centre shaft 16 of the disc coil is provided at its lower end with a drive wheel 26, preferably a tooth gear, engaging a drive wheel 27, which is fixedly secured on the shaft carrying the rotary capacitor plates in the variable capacitor 17 of the capacitor unit. In the illustration this is indicated by the dotted line 27*a*. By means of this coupling the rotary capacitor plates will thus be rotated at the same time as the contact 14 abutting the winding turns of the disc coil is displaced. The drive wheel 26 on the shaft 16 of the disc coil in the illustration is also shown abutting a driving wheel 28, which is arranged on a motor shaft, driven by a motor unit 29. Instead of motor drive it is easily understood that a manual drive is also possible. When the motor is in operation, the drive wheel 28 thus rotates both the wheel 26, which is arranged on the shaft 16 of the coil, and the wheel 27, which is arranged on the shaft of the rotary capacitor plates. The contact 14 on the disc coil will thus, depending on the direction of rotation of the motor, be displaced in the one or the other direction along the winding turn of the coil on which the contact is located at the same time as the capacitor plates rotate so that the capacitance of the variable capacitor varies between a minimum value and a maximum value.

By measuring, by means of measuring instruments connected in a suitable manner, both the power passing through the feeder cable 22 to the aerial and the power which is reflected back from the aerial through the feeder cable an opinion is easily obtained of whether the aerial is tuned or not. If the drive motor 29 is started so that the inductance of the disc coil is varied in one direction, it is easy to determine by the reading of said instruments, whether the aerial impedance is varied in a direction corresponding to a better tuning of the aerial to the feeder at the momentary frequency. If the aerial impedance is changed in such a manner that its value becomes more resistive and approaches the resistance value of the aerial feeder cable, the energy travelling in a direction towards the aerial will increase at the same time as the energy reflected from aerial decreases. By a continued variation of the inductance value of the disc coil in the same direction the aerial can thus be matched better and better to the resistance of the feeder. Hereby the maximum value is finally reached for the power travelling towards the aerial and at the same time a minimum value for the power reflected from the aerial, which, consequently, indicates that the aerial has been tuned as well as possible according to the conditions given. If, thereafter, the inductance is allowed to vary further, the mismatching of the aerial will again increase, which is indicated by a reduction of the energy fed to the aerial and an increase of the energy reflected from the aerial. If this condition arises, the direction of rotation of the drive motor should be reversed so that the inductance of the coil is changed again in a direction towards a better tuning of the aerial. Since the tuning is produced by means of only one motor, the operation can be controlled in a simple manner by means of two press buttons, one for each direction of rotation, or by means of a switch with two positions.

The device according to the invention is adapted to be utilized with radio transmitters with powers up to 1,000 W peak power within frequency ranges 1.5 – 30 MHz. The device can be used with all transmitters, if the installation is such that a coaxial cable is installed between transmitter and aerial. Rod aerials having a length of 5–10 meters can be connected to the tuning unit without stays, and also long wire aerials up to a length of 40 meters can be used. The device has a low weight and a small size and is simple to install.

It is evident that many different embodiments are possible within the scope of the invention. Thus it is not necessary that the coil connected in series with the aerial is formed by a helically wound disc coil but that also a conventional solenoid can be used. However, in this case the device for the movement of the contact on the various winding turns will be somewhat more complex and in addition the disc coil has greater mechanical and electrical stability. Further, it is possible to insert various gear wheels between the drive wheels which are secured on the shaft of the coil and on the shaft which carries the rotary capacitor plates, so that a desired ratio of rotation is obtained between the movable contact on the coil and the rotary capacitor.

I claim:

1. An aerial tuning device comprising a coil having a variable inductance and being connected in series with the aerial and a capacitor having variable capacitance and being connected to the coil, the coil and the capacitor together forming a tuning circuit for the aerial, said coil being provided with a contact which is movable along the winding turns of the coil for variation of the inductance of the coil, said capacitor having a capacitance setting shaft which is continuously rotatable in either direction for variation of the capacitance up and down repeatedly, said shaft being coupled with the movable contact of the coil in such a way that the capacitance swings repeatedly between a minimum value and a maximum value during the moving of the coil contact in one direction, said coil being provided with a rotary arm which at its one end is supported on a shaft concentric with the coil and at its other end carries said movable contact which is moved on the winding turns of the coil during the rotation of the arm about the shaft, said coil shaft and said capacitance setting shaft being provided with one drive wheel each, said drive wheels being mutually engaged and adapted to be rotated in a predetermined ratio, one of said drive wheels engaging a drive wheel which is mounted on a rotary drive shaft.

2. An aerial tuning device, comprising a coil having variable inductance and being connected in series with the aerial and a capacitor having variable capacitance and being connected to the coil, the coil and the capacitor together forming a tuning circuit for the aerial, said coil being provided with a contact, which is movable along the winding turns of the coil for variation of the inductance of the coil, and said capacitor having a capacitance setting shaft which is continuously rotatable in either direction for variation of the capacitance up and down repeatedly, said shaft being coupled with the movable contact of the coil in such a way that the capacitance of the capacitor varies up and down repeatedly between a minimum value and a maximum value during the moving of the coil contact in one direction, wherein the capacitor comprises a variable portion and at least one fixed portion connected in parallel with said variable portion, said capacitor being adapted to be connected between either end of the coil and earth.

* * * * *